United States Patent [19]
Halling

[11] Patent Number: 5,158,305
[45] Date of Patent: Oct. 27, 1992

[54] PRESSURE-ENERGIZED TWO-ELEMENT SEAL

[75] Inventor: Horace P. Halling, Laurel, Md.

[73] Assignee: EG&G Pressure Science, Inc., Beltsville, Md.

[21] Appl. No.: 828,673

[22] Filed: Jan. 31, 1992

[51] Int. Cl.⁵ .............................................. F16J 15/06
[52] U.S. Cl. ..................................... 277/236; 277/27; 277/205; 277/206 R
[58] Field of Search ................... 277/236, 206 R, 205, 277/27, 194, 199, 83

[56] References Cited

U.S. PATENT DOCUMENTS

| | | | |
|---|---|---|---|
| 1,223,650 | 4/1917 | Williams | 277/206 R |
| 2,248,385 | 7/1941 | Reynolds | 277/206 R |
| 2,263,756 | 11/1941 | Bowers | 309/44 |
| 2,941,825 | 6/1960 | Heinrich | 277/83 |
| 3,012,802 | 12/1961 | Waite | 288/31 |
| 3,352,006 | 11/1967 | Satoh et al. | 277/236 |
| 3,469,850 | 9/1969 | Jackson et al. | 277/83 |
| 3,595,588 | 7/1971 | Rode | 277/206 R |
| 3,797,836 | 3/1974 | Halling | 277/200 |
| 4,121,843 | 10/1978 | Halling | 277/200 |
| 4,218,067 | 8/1980 | Halling | 277/205 |
| 4,348,032 | 9/1992 | Hanson et al. | 277/206 R |
| 4,361,335 | 11/1982 | Vinciguerra | 277/204 |
| 4,438,939 | 3/1984 | Pask et al. | 277/236 |
| 4,457,523 | 7/1984 | Halling et al. | 277/236 |
| 4,477,086 | 10/1984 | Feder et al. | 277/26 |
| 4,813,692 | 3/1989 | Halling et al. | 277/236 |
| 4,854,600 | 8/1989 | Halling et al. | 277/236 |
| 4,915,397 | 4/1990 | Nicholson | 277/206 R |
| 5,078,412 | 1/1992 | Baumgarth | 277/236 |

Primary Examiner—William A. Cuchlinski, Jr.
Assistant Examiner—Daniel G. DePumpo
Attorney, Agent, or Firm—Roylance, Abrams, Berdo & Goodman

[57] ABSTRACT

A sealing ring including first and second annular elements, each being substantially J-shaped in cross section. Each element includes a leg portion and an arcuate portion, the arcuate portion of the first and second annular elements being coaxially interfitted to form a pivotal connection between the first and second annular elements. The leg portions of the first and second annular elements are acutely angled with respect to each other to form a V-shaped diverging annular enclosure opening towards a source of relatively high fluid pressure when the sealing ring is installed.

13 Claims, 1 Drawing Sheet

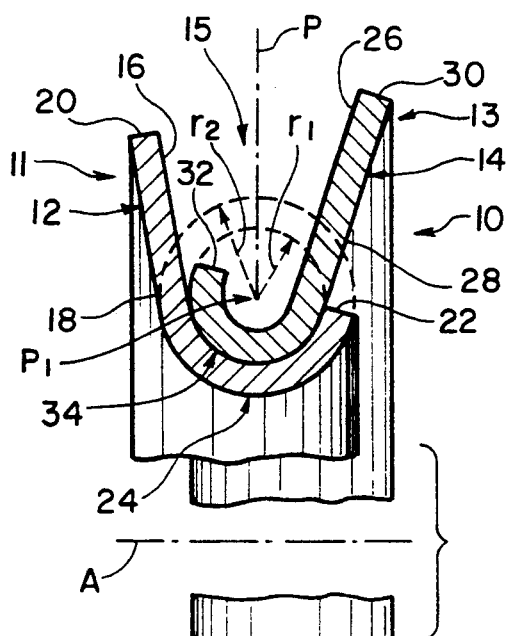
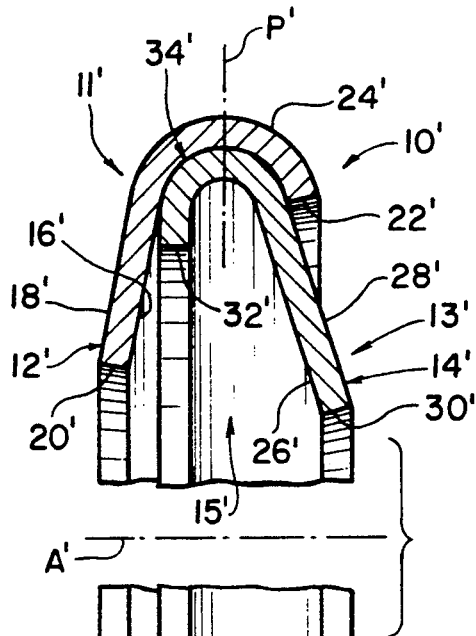
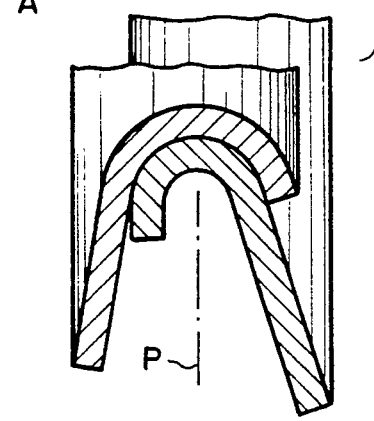
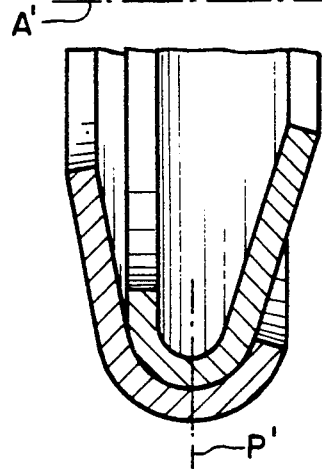
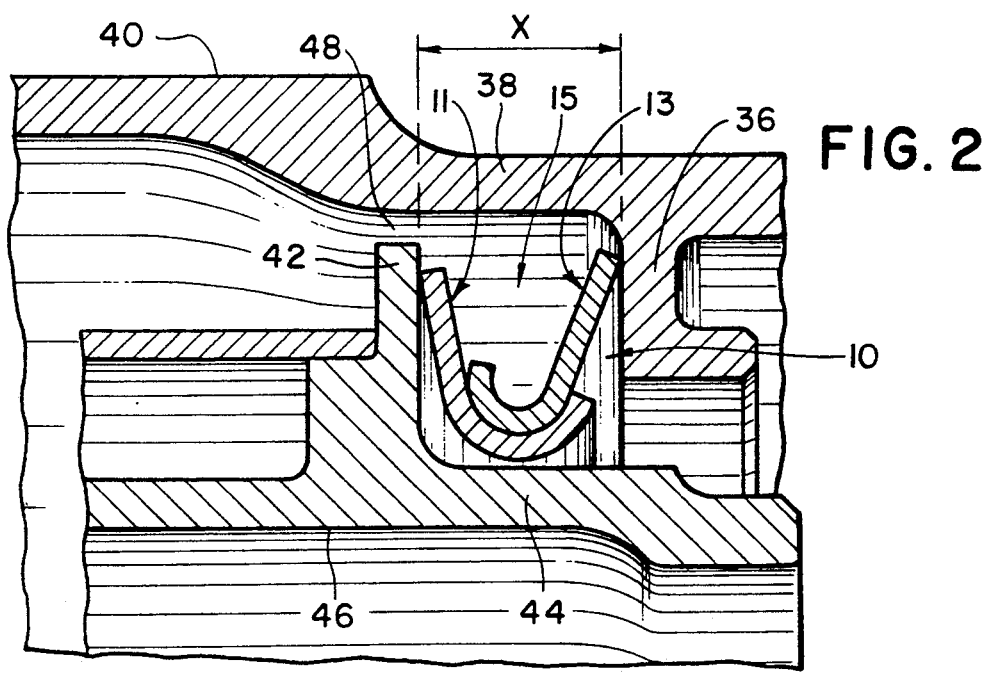

PRESSURE-ENERGIZED TWO-ELEMENT SEAL

FIELD OF THE INVENTION

The invention relates to sealing rings which are used to confine fluid at high temperatures and pressures. The sealing ring includes two interlocked J-shaped annular elements which are pressure-energized to engage adjacent facing surfaces while being freely pivotal with respect to each other, thus avoiding undue bending stresses that might otherwise arise.

BACKGROUND OF THE INVENTION

Sealing rings used to confine fluids in gas turbine engines generally are required to repeatedly accommodate large variations in axial length due to the thermal expansions and contractions of the assemblies of which thy are a part. Also, they must not lose their resilience due to relaxation and they must avoid rupture due to metal fatigue. Sealing rings should also be pre-compressed to compensate for variations in the distance between the facing surfaces being sealed. These variations result from the accumulation of manufacturing tolerances, for example.

In the turbine nozzle section of an aircraft gas turbine engine, sealing rings must retain their resilience at temperatures at which the stress-relaxation characteristics of available deformable materials necessitate very low stress levels to resist metal fatigue. Thus, sealing rings that absorb the strain energy of deflection in bending may not be suitable in some high temperature applications. Halling U.S. Pat. No. 4,121,843 and Halling et al U.S. Pat. Nos. 4,457,523, 4,813,692 and 4,854,600 describe seals in which axial or radial displacements are converted to rotation of the seal cross-section to thereby reduce or eliminate bending stresses. These seals generally perform well but have practical disadvantages. For example, the seals in U.S. Pat. Nos. 4,813,692 and 4,854,600 require tooling and fixturing and/or tight tolerancing of mating parts to ensure engagement between a specified point on the seal section and the sealing cavity wall. Moreover, the seal described in U.S. Pat. No. 4,457,523 is not pressure-energized and thus may lose sealing capabilities when the pressure-differential is sufficiently high.

Pask et al U.S. Pat. No. 4,438,939 describes an annular seal in which belville washers are placed in opposing-hand pairs, with abutting peripheries joined by a U-section ring. This design is intended to allow the individual washers to vary their angular disposition with respect to each other to accommodate relatively large axial motion between two members being sealed. This is accomplished without creating bending stresses. A drawback, however, is that the sealing ring assembly is difficult to use in the confined space of an annular chamber. Also, the two washers have no interconnection to each other, but are instead joined by a separate ring. At higher pressure differentials, where a gap is created by lift-off of the sealing washer elements at their interface, limited leakage will occur through two parallel paths at the U-ring/conical washer interfaces. Moreover, the U-ring is necessarily of very small cross-section and is thus very flimsy in large diameters. This creates a danger of "spontaneous disassembly of the components during installation of the ring, where it sometimes may not be possible to see what has occurred due to deep insertion of mating components.

SUMMARY OF THE INVENTION

An object of the present invention is to provide an improved sealing ring which is relatively simple in construction and cost effective to produce.

Another object of the present invention is to provide an improved sealing ring capable of being used in an extremely high temperature environment, having the ability to repeatedly accommodate large variations in axial length due to thermal expansions and contractions.

Another object of the invention is to provide a sealing ring having a single leakage path at the interface of two J-shaped elements.

Still another object of the invention is to provide an improved sealing ring capable of compensating for variations in the distance between the faces being sealed.

These and other objects are met by providing a sealing ring including first and second annular elements, each being substantially J-shaped in cross section and including a leg portion and an arcuate portion, integrally formed with the leg portion, the arcuate portions of the first and second annular elements being coaxially interfitted to form a pivotal connection between the first and second annular elements, and the leg portions of the first and second annular elements being acutely angled with respect to each other to form a V-shaped diverging annular enclosure opening towards a source of relatively high fluid pressure when the sealing ring is installed, the width of the V-shaped diverging enclosure varying in accordance with pivotal movement of the first and second annular elements.

The leg portions bear against and sealingly engage opposite faces of an annular chamber in which the sealing ring is installed. Pressure from within the converging passageway forces the legs into tighter sealing engagement.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

The invention will be more fully described by reference to the drawings wherein:

FIG. 1 is a partial longitudinal sectional view showing the details of the sealing ring of this invention with the leg portions of the sealing elements extending radially outwardly;

FIG. 2 is a partial longitudinal sectional view taken through an aircraft engine assembly showing an installation in which the sealing ring of this invention has a particular utility; and FIG. 3 is a partial longitudinal sectional view of a second embodiment of the invention in which the leg portions of the sealing elements extend radially inwardly.

DETAILED DESCRIPTION OF THE INVENTION

Referring now to FIGS. 1 and 2, a sealing ring according to the present invention is generally referred to by the numeral 10 and includes two interfitted rings or annular elements 11 and 13 which are coaxially arranged about longitudinal axis A.

Annular element 11 has an inner surface 16, an outer surface 18, a distal end 20, and a base end 22. The distal end 20 defines a circular outer periphery. A frustoconical leg portion 12 terminates at the distal end 20, while an arcuate portion 24, integrally formed with the leg portion 12, terminates at the base end 22. The arcuate portion 24 defines an inner periphery of the annular element 11. Any conventional means may be employed to form the arcuate portion. For example, if the annular element 11 is made of resilient metal, as is the case for the preferred embodiment of the invention, the arcuate portion may be formed by bending. The arcuate portion 24 extends at first substantially axially and then radially outwardly so that, in radial section, the annular element 11 is J-shaped. The leg portion 12 of the "J" is angled away from a transverse plane P which is perpendicular to axis A and passes through the point $P_1$ which is the center of the radius of curvature of convex outer surface 18. At the arcuate portion 24, the outer surface 18 is convex and the inner surface 16 is concave. The leg portion 12 of the annular element 11 has frustoconical inner and outer surfaces, with the outer surface end 20 sealingly engaging an adjacent face of the annular chamber when the sealing ring 10 is installed.

Similarly, the annular element 13, which is also J-shaped in cross section has an inner surface 26, an outer surface 28, a distal end 30 and a base end 32. The distal end defines the outer periphery of the element 13. A leg portion 14 of the annular element 13 is frustoconical, terminates at the distal end 30 and is angled away from plane P, oppositely from the leg portion 12 to define a V-shaped diverging annular enclosure 15 therebetween. An arcuate portion 34 is formed integrally with the leg portion 14 and terminates at the base end 32. The arcuate portion 34 defines an inner periphery of the element 13 and leg portion 14 provides a sealing engagement with an adjacent face of an annular chamber. The outer surface 28 of the arcuate portion 34 is convex and the inner surface 26 is concave. Leg portions 12 and 14 appear straight in cross-section. However, in a slight variation, the legs may be formed to include a sinuous profile, flatten ends, or other suitable sealing configurations.

The convex outer surface 28 has a radius of curvature $r_1$, indicated by a phantom circle, which is substantially coincident with the radius of curvature of the concave inner surface 16 of the annular element 11. Thus, convex outer surface 28 and concave inner surface 16 are in fluid tight contacting but slidable engagement, with annular elements 11 and 13 being interfitted and interlocked against relative axial movement to form a pivotal joint as seen in FIG. 1. In this configuration, leg portions 12 and 14 extend radially outwardly and enclosure 15 is outwardly opening. The convex outer surface 18 of the annular element 11 has a radius of curvature designated $r_2$, indicated by a second phantom circle, which is greater than $r_1$. Both radii $r_1$ and $r_2$ preferably have the same pivot point or center $P_1$ when the two annular elements are interfitted together. Since variable thickness or specially profiled exteriors may be used, r, and $r_2$ may not necessarily have the same pivot center.

The two elements 11 and 13 are pivotal with respect to each other about an annular pivot line which is received in plane P and corresponds to an infinite number of pivot centers $P_1$. The two leg portions of the two annular elements 11 and 13 are acutely angled with respect to each other and, together with the arcuate portions, form the outwardly opening and diverging substantially V-shaped (in cross section) annular enclosure 15. The open end of the enclosure 15 is exposed to high pressure, while the closed end, where the two arcuate portions interconnect, is fluid tight, due to the overlapping and contacting surfaces of the arcuate portions. The acute angle of the legs varies as the two elements pivot about the pivot center $P_1$. If the leg portions 12 and 14 have flattened end portions, the enclosure 15 may appear more U-shaped than V-shaped.

Forces which may cause relative pivotal movement of the two annular elements can be more fully appreciated when referring to FIG. 2, in which the sealing ring 10 is illustrated in an installed position in an aircraft gas turbine engine. The sealing ring 10 is located in an annular cavity defined by an annular flange 36 and an annular outer wall 38 of a large conduit pipe 40 and an annular flange 42 and annular wall 44 of a smaller pipe 46 contained within the larger pipe 40. Fluid pressure is exerted through the channel 48 between wall 38 and flange 42 and into the V-shaped converging enclosure 15 defined between the inner surfaces of the two annular elements 11 and 13. The dimension designated by the letter "X" in FIG. 2 is subject to build tolerance accumulation and relative thermal expansion of assembled components. As the dimension X varies, the two annular elements 11 and 13 pivot to accommodate the dimensional variations. Also, as the fluid pressure differential between the two sides of the sealing ring increases, the outer surface of each annular element sealingly engages the respective opposing annular flat faces of the flanges 36 and 42 with greater sealing force. Thus, the sealing of a zone of relatively high pressure from a zone of relatively low pressure is ensured.

Friction and wear between the two elements 11 and 13 may be reduced by applying a tribological coating to one or both of the engaging surfaces of the two arcuate portions 24 and 34. One particularly advantageous material is that sold under the trademark TRIBOGLIDE. Only one of the two elements needs its surface contacting the other element to be coated with TRIBOGLIDE when the annular elements 11 and 13 are made of hardened nickel or cobalt-based alloys.

In the case of relatively large diameter seal assemblies, the two sealing elements may be completely formed separately. The outer of the two annular elements, corresponding to element 13 of FIG. 1, is then snapped over the inner element to complete the assembly. For smaller diameters, the outer annular element may be formed over the completely formed inner annular element, with the two elements then being heat treated as an assembly. TRIBOGLIDE or other suitable material may be applied and then subsequently subjected to heat treatments in intimately contacting assemblies, without fear of adhesion between the coating and the uncoated element. For the smaller diameter sealing ring assemblies, TRIBOGLIDE may be applied to the completely finished element before the second element is formed around it.

The embodiment of FIGS. 1 and 2 is of a sealing ring in an externally pressurized orientation, but the concept of the present invention applies equally to an internally pressurized orientation. The only requirement is that the open end of the V-shaped diverging enclosure always faces the higher pressure zone. As seen in FIG. 3, a second embodiment 10' of the present invention is shown in which the V-shaped diverging enclosure 15' is inwardly opening and is used when the high pressure is inside the sealing ring 10'. Sealing ring 10' is the same as sealing ring 10 shown in FIGS. 1 and 2 except that the enclosure 15' is inwardly opening and like reference numerals are used for like elements with the addition of a prime.

While the description above refers to an "annular" sealing ring, the sealing ring may also be of near annular or arcuate shape to define less than a complete circle. A complete sealing ring may also comprise plural arcuate sections defining a complete or nearly complete annulus. The planform of the sealing "ring" may be shaped to any configuration with sides or facets having enough curvature to ensure stability and adequate contact pressure between the sealing elements after installation (e.g., rectangular, with outwardly bowed sides, and corner radii).

Although the preferred embodiment of the present invention contemplates the use of metallic materials for forming the annular elements, other suitable materials may be employed, including ceramic materials. Generally, it is not necessary for the chosen material to be highly flexible or resilient since the two J-shaped elements pivot with respect to each other.

While particularly advantageous embodiment has been chosen to illustrate the invention, it will be understood by those skilled in the art that various changes and modifications can be made therein without departing from the scope of the invention as defined in the appended claims.

What is claimed is:

1. A sealing ring comprising:
   first and second annular elements, each being substantially J-shaped in cross section and including a frustoconical leg portion and an arcuate portion integrally formed with the leg portion,
   the arcuate portions of the first and second annular elements being coaxially interfitted and slidable relative to each other to form a pivotal connection between the first and second annular elements, and the leg portions of the first and second annular elements being acutely angled with respect to each other to form a substantially V-shaped diverging annular enclosure opening towards a source of relatively high fluid pressure when the sealing ring is installed,
   the width of the V-shaped diverging annular enclosure varying in accordance with pivotal movement of the first and second annular elements.

2. A sealing ring according to claim 1, wherein
   each of the first and second annular elements has an inner surface, an outer surface, a base end and a distal end, each arcuate portion terminating at the respective base end.

3. A sealing ring according to claim 2, wherein
   the inner surface of the arcuate portion of the first annular element has a radius of curvature $r_1$ substantially coincident with a radius of curvature of the outer surface of the arcuate portion of the second annular element.

4. A sealing ring according to claim 3, wherein
   the outer surface of the first annular element has a radius of curvature $r_2$, $r_1$ and $r_2$ having a common pivot center located along an annular pivot line of the first and second annular elements.

5. A sealing ring according to claim 1, wherein
   the first and second annular elements are made of resilient metal.

6. A sealing ring according to claim 1, and further comprising
   a coating of tribological material between the first and second annular elements between opposing surfaces of the respective arcuate portions.

7. A sealing ring comprising:
   first and second annular elements, each having a longitudinal axis, a base end, a distal end, a leg portion angled away from a transverse plane perpendicular to the longitudinal axis and terminating at the distal end, an arcuate portion coextensive with the leg portion and terminating at the base end,
   each annular element being substantially J-shaped in cross section, each arcuate portion having a convex surface and a concave surface,
   the arcuate portions of the first and second annular elements being interfitted coaxially and cooperating to form a pivotal joint and a V-shaped diverging annular enclosure opening towards a source of relatively high fluid pressure,
   the concave surface of the arcuate portion of the first annular element slidably engaging the convex surface of the arcuate portion of the second element, the V-shaped diverging enclosure having a width which varies in accordance with pivotal movement of the first and second annular elements.

8. A sealing ring according to claim 7, wherein
   the concave surface of the arcuate portion of the first annular element has a radius of curvature $r_1$ substantially coincident with a radius of curvature of the convex surface of the arcuate portion of the second annular element.

9. A sealing ring comprising:
   a first annular element having a longitudinal axis, first and second ends and a first portion of a complementary pivotal joint formed at the first end; and
   a second annular element having a longitudinal axis, first and second ends and a second portion of the complementary pivotal joint formed at the first end of the second annular element;
   the first and second portions of the complementary pivotal joint being interfitted and the first and second portions of the complementary pivot joint being slidable relative to each other to thereby pivotally connect the first and second annular elements and thus form a V-shaped diverging annular enclosure opening towards a source of relatively high fluid pressure, the V-shaped diverging annular enclosure having a width which varies in accordance with relative pivotal movement between the first and second elements.

10. A sealing ring according to claim 9, wherein
    each of the first and second annular elements includes a base end, a distal end, a frustoconical leg portion angled away from a transverse plane perpendicular to the longitudinal axis and terminating at the distal end, and an arcuate portion coextensive with the leg portion and terminating at the base end,
    each annular element being substantially J-shaped in cross section, each arcuate portion having a convex surface and a concave surface, the arcuate portion of the first and second annular elements being interfitted coaxially and cooperating to form the pivotal joint, the concave surface of the arcuate portion of the first annular element slidably engaging the convex surface of the arcuate portion of the second annular element.

11. A sealing ring according to claim 10, wherein
    the concave surface of the arcuate portion of the first annular element has a radius of curvature $r_1$ substantially coincident with a radius of curvature of the convex surface of the arcuate portion of the second annular element.

12. A sealing ring according to claim 9, wherein the V-shaped annular enclosure is radially outwardly opening.

13. A sealing ring according to claim 9, wherein the V-shaped annular enclosure is radially inwardly opening.

* * * * *